United States Patent [19]
Hulbert

[11] Patent Number: 5,471,463
[45] Date of Patent: Nov. 28, 1995

[54] RADIO COMMUNICATION SYSTEMS

[75] Inventor: Anthony P. Hulbert, Southampton, England

[73] Assignee: Roke Manor Research Limited, Hampshire, England

[21] Appl. No.: 52,968

[22] Filed: Apr. 27, 1993

[30] Foreign Application Priority Data

May 27, 1992 [GB] United Kingdom ............. 921178

[51] Int. Cl.⁶ .................................................. H04J 13/02
[52] U.S. Cl. .......................................... 370/18; 375/200
[58] Field of Search ............................. 375/1; 370/18, 370/93; 455/33.1, 33.2, 33.3, 33.4; 379/58, 59, 60

[56] References Cited

U.S. PATENT DOCUMENTS

| | | | |
|---|---|---|---|
| 4,697,260 | 9/1987 | Grauel et al. | 370/18 |
| 5,109,390 | 4/1992 | Gilhousen et al. | 455/33.2 |
| 5,150,377 | 9/1992 | Vannucci | 375/1 |
| 5,161,168 | 11/1992 | Schilling | 375/1 |
| 5,218,618 | 6/1993 | Sagey | 455/33.1 |

FOREIGN PATENT DOCUMENTS

| | | |
|---|---|---|
| 0484065 | 5/1992 | European Pat. Off. . |
| 91/03892 | 3/1991 | WIPO . |
| 91/15918 | 10/1991 | WIPO . |

Primary Examiner—Douglas W. Olms
Assistant Examiner—Ajit Patel
Attorney, Agent, or Firm—Keck, Mahin & Cate

[57] ABSTRACT

CDMA (Code Division Multiple Access) can be used in cellular mobile radio systems to provide good spectral efficiency through averaging the interference wherever the number of users per carrier is large (several tens). This is readily practicable for voice users whose data rate requirements are modest but requires large spreading factors for ISDN data service users. This invention proposes an approach in which a multiplicity of CDMA carriers each with relatively low bandwidth are used for the voice services and overlayed with wide bandwidth CDMA carriers whose bandwidth occupies the whole (or most) of the band occupied by all of the narrowband CDMA carriers in order to service the data users. This allows the same RF band to service a relatively small number of data service users with wideband (and therefore higher cost) terminals without affecting the cost of terminals for the majority of voice users.

4 Claims, 3 Drawing Sheets

RADIO COMMUNICATION SYSTEMS

This invention relates to radio communication systems and more especially it relates to cellular mobile radio communication systems.

The term "mobile" when used herein includes vehicular mobility and/or pedestrian mobility; i.e. mobile units may be mounted in vehicles and/or held.

Cellular mobile radio systems may use various multiple access schemes to connect the mobile user to the base station hub. Recently, a CDMA (Code Division Multiple Access) scheme based on DSSS (Direct Sequence Spread Spectrum) has been proposed. This is claimed to provide improvements in system capacity for a given density of cellular base stations and for a given allocation of spectrum as compared to other, more conventional, systems. These benefits accrue largely from the averaging of interference which arises through servicing a relatively large number of users in one cell or one cell sector. Thus, for example, the system self interference level is reduced by only transmitting as required according to the voice activity of the individual users. With cell sectoring, the level of interference received at the base station from users in other sectors is reduced by the average (rather than the worst case, i.e. minimum) attenuation of the antenna outside its main beam.

These effects make for a significant increase in the number of users which can operate simultaneously in a single cell. The benefits are obtained whenever the traffic requirements of any single user constitute only a small fraction of the capacity available to all users in the cell/sector so that averaging takes place over many users. With current technology, a bandwidth of about 1 MHz is readily practicable in terms of available technology for mobiles, or in the future for hand portable voice terminals. This is adequate to provide for a large number (several tens) of voice users and so to provide capacity benefits through averaging. It is also desirable however to provide for data transmission in addition to voice transmission.

The requirements of data service users greatly exceed the needs for voice. For example, a single ISDN (Integrated Service Digital Network) operating at 64 kbps, requires some ten times greater capacity than a low rate voice encoder. For a number of users requiring such facilities, a 1 MHz spreading system would be inefficient, supporting only a small number of users per carrier and failing to benefit from averaging of interference. Thus for data services, a wider band spreading system, say 10 MHz, would be desirable. It would however be undesirable to use this wider band system for voice users since the increased bandwidth would make for additional complexity, power consumption and cost. Moreover it would postpone the time at which hand portable voice terminals would become practicable.

According to the present invention a radio communication system comprises a base station which is arranged in communication with a plurality of mobile stations for the transmission of speech using a first set of channels and for the transmission of data using a second set of channels, the channels of the said first set each having substantially the same bandwidth and comprising a plurality of groups of channels wherein each group of channels is arranged to operate using a different frequency, i.e. in an FDMA (Frequency Division Multiple Access) mode, and wherein all channels within a group are arranged to operate on the same nominal carrier frequency, and wherein the channels of each group are transmitted using CDMA (Code Division Multiple Access) whereby each channel of a group is distinguished from every other channel of that group by a unique CDMA code, the channels of the second set being transmitted each on the same nominal carrier frequency using CDMA for mutual discrimination, the frequency bandwidth used for the channels of the said second set being arranged to correspond with the bandwidth occupied by at least some of the groups of the first set in combination.

The frequency bandwidth occupied by the channels of the second set may conveniently be the same as the frequency bandwidth occupied by all of the groups of the first set in combination.

In accordance with one embodiment of the invention a plurality of second set channels may be provided, each arranged to occupy a different frequency band so that in combination they occupy a bandwidth which corresponds to the bandwidth occupied by a third set of channels which use CDMA for mutual discrimination.

Apparatus for implementing a system according to the present invention may comprise a base station having for transmission purposes a plurality of CDMA modulators one for each channel of a plurality of groups of channels, wherein the channels of each group are arranged to operate at the same nominal carrier frequency, the modulators being fed from a multiplexer under control of a switching centre and being arranged to feed a plurality of frequency 'up-converters' one for each modulator which are coupled to a transmission signal combiner which in turn is arranged to feed a transmit antenna, and wherein the CDMA spreading bandwidth of one of the modulators used for one group of channels designated for carrying data corresponds to the bandwidth occupied by all of the other groups of channels in combination, the base station having for reception purposes a complimentary receiver arrangement.

Some embodiments of the invention will now be described by way of example, with reference to the accompanying drawings, in which.

Figure 1:
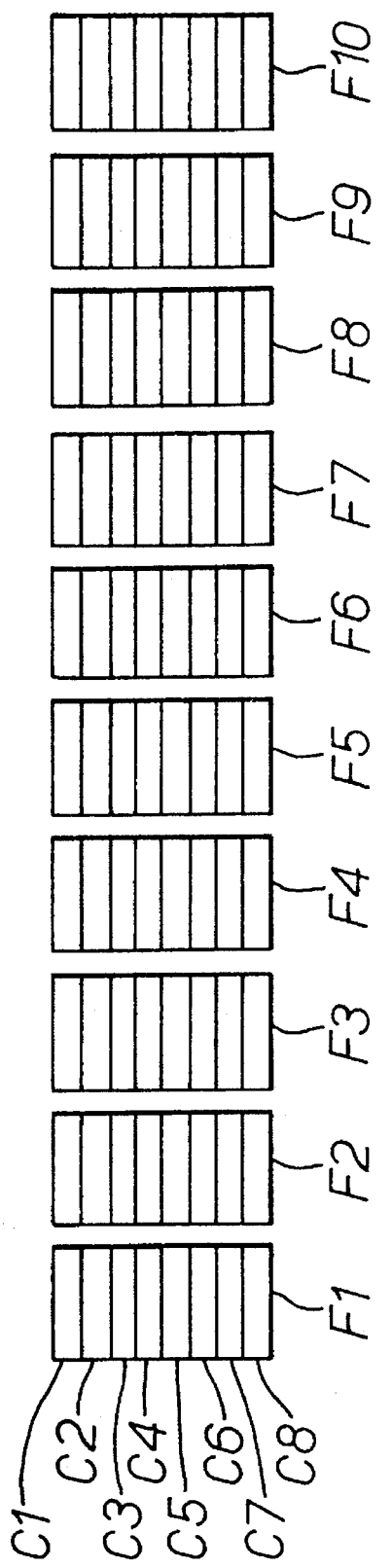
FIG. 1 is a diagram showing the channels of a known hybrid FDMA narrowband CDMA system.

Referring now to FIG. 1, a hybrid FDMA narrowband CDMA system comprises a plurality of groups of channels wherein each group is transmitted at a different frequency F1 to F10 as shown in FIG. 1. Each group comprises eight channels which are mutually distinguished by CDMA and accordingly each channel is transmitted using a different CDMA code. By way of example eight channels referenced C1 to C8 are shown for the group which operates at the frequency F1. In the system illustrated each spreading code might spread to a bandwidth of 1 MHz whereby a total bandwidth of 10 MHz is used for all of the groups F1 to F10. It will be appreciated that each channel "stack" represents a different carrier frequency whilst each pattern in the "stack" represents a different code used on that carrier frequency.

Figure 2:
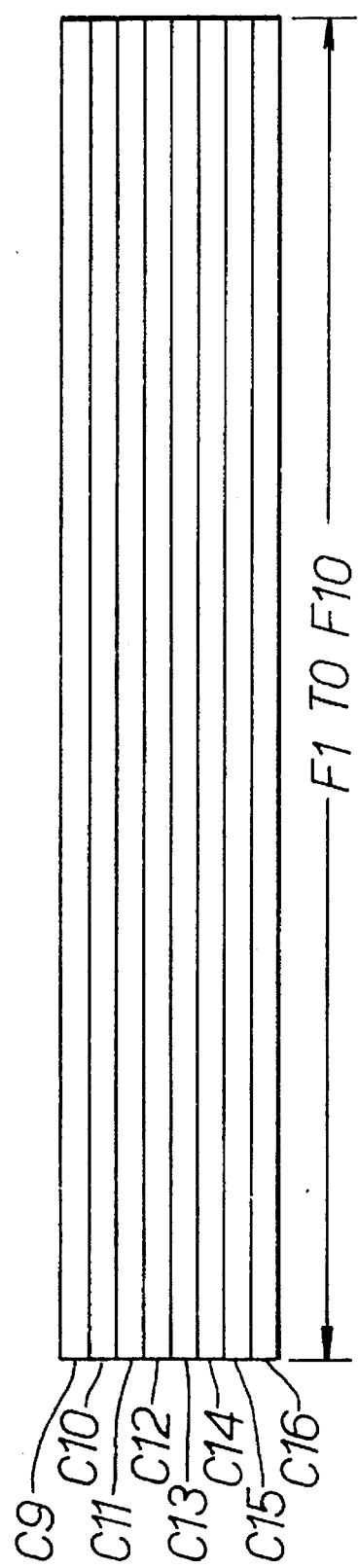
FIG. 2 is a diagram showing the channels of a wideband FDMA system.

Referring now to FIG. 2, a wideband CDMA system comprising eight channels C9 to C15 is illustrated which spreads over the entire 10 MHz bandwidth occupied by the frequencies F1 to F10 of the group shown in FIG. 1. In known systems this would normally be considered as the only approach to achieve spectrally efficient provision of wideband data services but if the entire spectrum were converted in this manner then the power/speech/complexity/cost of the mobile units would need to increase. Moreover, a change to this approach for all channels to facilitate the transmission of data would require the replacement of all existing mobiles.

Figure 3:
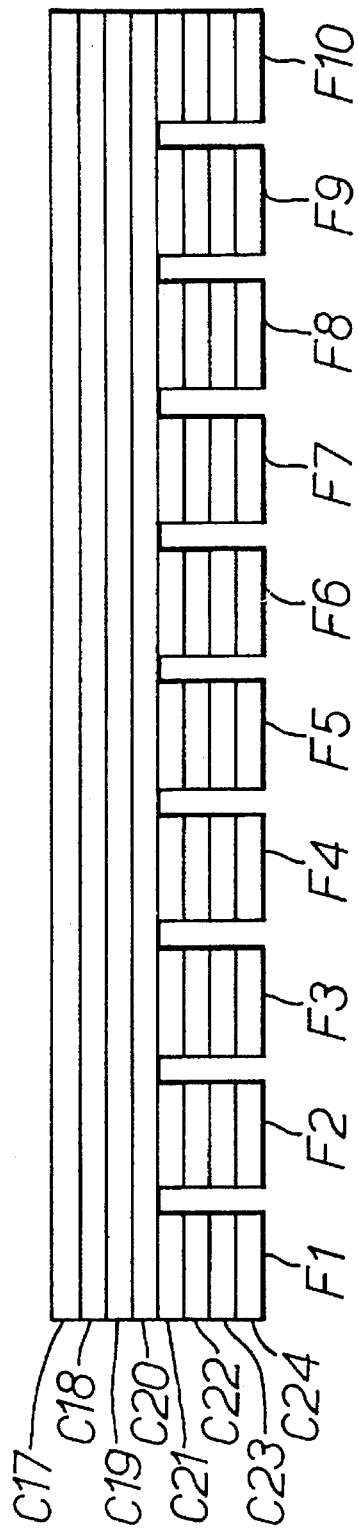
FIG. 3 is a diagram showing the channels of a system according to one embodiment of the invention, which uses wideband CDMA for data transmission and hybrid FDMA narrowband CDMA for speech transmission.

Referring now to FIG. 3, the channels of a system according to the present invention are shown, wherein channel C16 to C19 which occupy the entire 10 MHz bandwidth are used for the transmission of data whereas 10 groups of channels wherein each group comprises 4 channels thereby to provide a total of 40 channels are used for speech but each speech channel has only 1 MHz bandwidth. As shown in FIG. 3 channels C20 to C23 are transmitted at the frequency F1 and are mutually distinguished by means of CDMA using a unique code for each channel. This is in effect an overlay approach wherein voice users remain on a narrowband CDMA carrier whilst a wideband data service is used which employs full band spreading. Thus, the voice users can continue uneffected by the wideband users except to the extent that the voice and data systems share the available bandwidth capacity. It will be appreciated that the system as a whole retains the high spectral efficiency inherent in a CDMA approach without paying a penalty of inflexibility imposed by the other data system usage.

A system according to the invention is particularly attractive in that it provides an evolutionary path for systems as;

(a) more spectrum becomes available;

(b) technology makes spreading at the wider rates more practicable; and (c) users require increasingly wideband data services.

Figure 4:
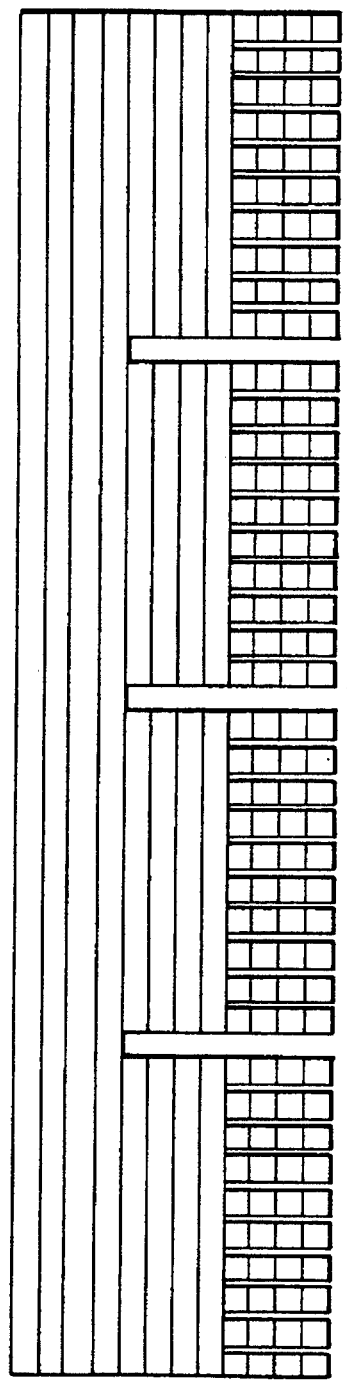
FIG. 4 is a diagram showing the channels of a system which is a development of the system shown in FIG. 3.

As shown in FIG. 4, wherein numerical designations are believed to be unnecessary, it can be seen that the approach need not be restricted to two layers, but if for example many wideband carriers at 10 MHz bandwidth were accumulated in additional spectral allocations, then super wide CDMA systems could be added as illustrated in FIG. 4.

In this case there are three levels of CDMA. The smallest rate could, for example, be 1 MHz, the next 10 MHz and the tope rate 40 MHz. Note that there is no theoretical restriction on the factors involved or in the number of layers. The only limitation is a practical one since each layer represents an investment in technology designed for that layer (although considerable architectural commonalty is possible). Additionally is not essential, when designing the bottom (lowest rate) layer, to determine at that stage, the multiple of its bandwidth which will be used for any overlaying system added at a later stage. Indeed the overlaying could probably be applied to existing systems.

Figure 5:
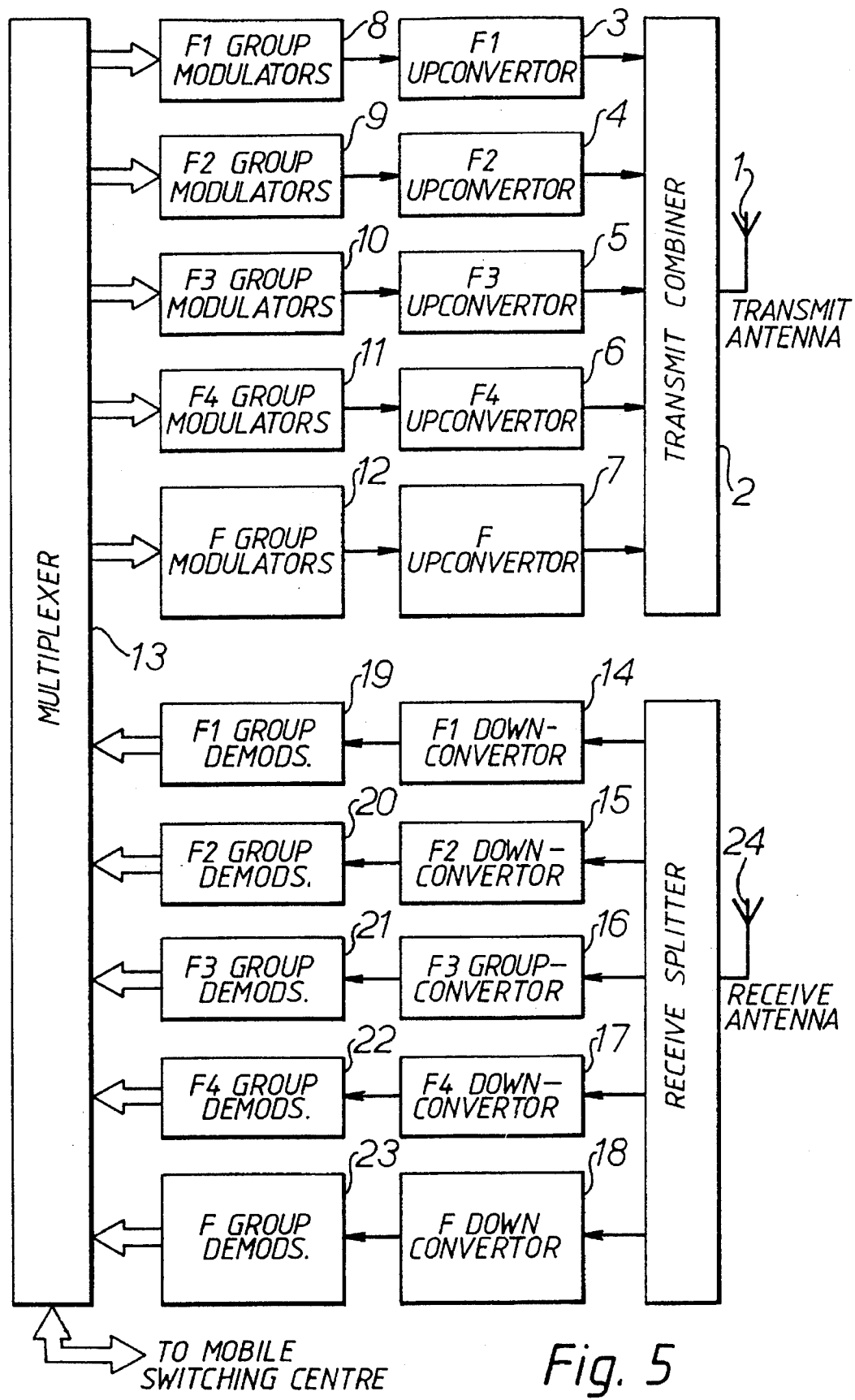
FIG. 5 is a block schematic diagram of a base station for use in a system according to the present invention.

Referring now to FIG. 5, a base station comprises for a cellular mobile radio system a transmit antenna 1 which is fed from a signal combiner 2. The signal combiner 2 is fed from a plurality of up converters 3, 4, 5, 6 and 7 which in turn are fed from modulator groups 8, 9, 10, 11 and 12. The modulators are controlled by a multiplexer 13 from a switching centre not shown. Each group of modulators 8, 9 10, 11 and 12 is arranged to operate at a different frequency, different channels within a group being distinguished by CDMA utilising a unique code for each channel. In this example groups 8, 9 10, and 11 are used for the transmission of speech and therefore assigned a small spreading bandwidth of say 1 MHz whereas the group 12 is used for data and accordingly assigned a much greater spreading bandwidth of say 10 MHz.

A complimentary receiver system is provided comprising a receiver antenna 13, and down converters 14, 15, 16, 17 and 18 which are arranged to feed de-modulators 19, 20, 21, 22 and 23. It will be appreciated that the de-modulators are arranged in groups 19, 20, 21, 22 and 23 and that each group works at a different frequency, the groups 19 to 22 being used for voice or speech and the group 23 being used for data.

An overlayed system as just before described utilising wideband CDMA/hybrid FDMA narrowband CDMA provides for flexible evolution of mobile communication systems to support new, widerband services using the same spectral allocation as existing voice services without disruption of those services.

I claim:

1. A radio communication system comprising a base station which is arranged in communication with a plurality of mobile stations for the transmission of speech using a first set of channels and for the transmission of data using a second set of channels, the channels of the first set each having substantially the same bandwidth and comprising a plurality of groups of channels wherein each group of channels is arranged to operate using a different frequency, and wherein all channels within a group are arranged to operate on a same carrier frequency, and wherein the data and speech in the respective channels of each group are transmitted using CDMA (Code Division Multiple Access), each channel of a group being distinguished from every other channel of that group by a unique CDMA code, the channels of the second set being transmitted each on the same carrier frequency using CDMA for mutual discrimination, the frequency bandwidth used for the channels of the second set being arranged to correspond within the bandwidth occupied by at least some of the groups of the first set.

2. A system as claimed in claim 1, wherein the frequency bandwidth occupied by the channels of the second set is the same as the frequency bandwidth occupied by all of the groups of the first set in combination.

3. A system as claimed in claim 1, wherein a plurality of second set channels is provided, each arranged to occupy a different frequency band so that in combination they occupy a bandwidth which corresponds to the bandwidth occupied by a third set of channels which use CDMA for mutual discrimination.

4. Apparatus for implementing a system according to claim 1, including a base station having for transmission purposes a plurality of CDMA modulators one for each channel of a plurality of groups of channels, wherein the channels of each group are arranged to operate on the on the same carrier frequency, the modulators being fed from a multiplexer under control of a switching center and being arranged to feed a plurality of frequency up converters, one for each modulator which are coupled to a transmission signal combiner which in turn is arranged to feed a transmit antenna, and wherein the CDMA spreading bandwidth of one of the modulators used for one group of channels designated for carrying data corresponds to the bandwidth occupied by all of the other groups of channels in combination.

\* \* \* \* \*